United States Patent [19]
Yokoyama et al.
[11] Patent Number: 4,662,234
[45] Date of Patent: May 5, 1987

[54] DRIVING APPARATUS FOR POWDER COMPACTING PRESS

[75] Inventors: Tatsuichi Yokoyama; Kazutami Takahashi, both of Nagaoka, Japan
[73] Assignee: Tamagawa Machinery Co., Ltd., Tokyo, Japan

[21] Appl. No.: 791,598
[22] Filed: Oct. 25, 1985
[51] Int. Cl.[4] ........................ B22F 3/00; F16H 35/02; F16H 55/17
[52] U.S. Cl. ........................................ 74/393; 74/437; 425/78
[58] Field of Search ...................... 74/27, 44, 437, 393; 425/78; 29/DIG. 31

[56] References Cited

U.S. PATENT DOCUMENTS 844,210 2/1907 Strickland ............................ 74/437
1,507,908 9/1924 Crawford ............................. 74/437
2,143,236 1/1939 Birk .................................. 74/437 X
2,167,320 7/1939 Yabe ................................. 74/437 X
2,867,844 1/1959 Hall ....................................... 425/78
3,687,586 8/1972 Hara et al. ........................... 425/78
3,823,617 7/1974 Infanger et al. .................. 74/347 X
3,972,670 8/1976 Henkel ............................. 425/78 X
4,003,681 1/1977 Wildhaber ........................ 74/437 X
4,443,171 4/1984 Dixon .................................. 425/78

*Primary Examiner*—Cornelius J. Husar
*Assistant Examiner*—Nancy J. Stodola
*Attorney, Agent, or Firm*—Fleit, Jacobson, Cohn & Price

[57] ABSTRACT

A pair of non-circular gears having a fixed sum of the radius of the gears is used as transmission gears secured between a power shaft and a crank shaft. Each radius of the non-circular gears increases or decreases according to the required rotation. A powder feeding time in one cycle is prolonged by delaying the lowering velocity of an upper ram near the lowermost dead point of the upper ram which carries out the powder compacting and performing a quick return motion of the upper ram after a compacting zone.

3 Claims, 9 Drawing Figures

DRIVING APPARATUS FOR POWDER COMPACTING PRESS

BACKGROUND OF THE INVENTION

This invention relates to a driving apparatus for a powder compacting press which transmits a vertical movement force to an upper ram for powder compacting.

Heretofore, a driving apparatus for a powder compacting press was adapted to rotate a power shaft by inertia rotation of a fly wheel through a motor, transmit this rotation to a crank shaft reducing it with a reduction gear consisting of gear rows, transmit the rotation of the crank shaft to the upper ram via a connecting rod and perform a press operation by moving the ram vertically. The purpose of the compression process in powder compacting is generally to promote the "compactibility" between powder particles at a nearly completed time of compression together with compacting which accompanies the air removal between powder paticles and plastic deformation. When the vertical movement of the upper ram with respect to one rotation of the crank shaft in a transmission system of driving force is plotted to a timing diagram, it is shown by a sine curve as shown in a dot-dash-line B of FIG. 3 and since the powder feeding time is comparatively long, sufficient powder feeding is possible.

However, since the lower dead point of the upper ram in this driving force transmission system is instantaneous (in a second) and short in time for compacting, the "compactibility" between powder particles is poor and spring back is large. Accordingly, these problems require the necessity of a large pressing force and easy occurrence of lamination for a forming product compared with compacting wherein a toggle curve is drawn.

Against this driving force transmission system, a driving apparatus, wherein an upper ram is actuated along a curve shown in broken line C of FIG. 3, using a toggle link mechanism, is also developed. Such toggle link mechanism, however, is short in powder feeding time and its feeding is also insufficient. Further, it is not only difficult in speed up, but also complicated mechanically.

SUMMARY OF THE INVENTION

The object of this invention is to provide a driving apparatus for a powder compacting press which is long in powder feeding time and also possible to have a long time for compacting. In order to attain the above object, this object is characterized by using a pair of non-circular gears having a fixed sum of each radius of the gears as transmission gears secured between the power shaft and the crank shaft and decrease or increases each radius according to the rotation, delaying the lowering velocity of the upper ram near the lower dead point of a upper ram which carries out the compacting, performing a quick return motion of the upper ram after a compacting zone and prolonging the powder feeding time in one cycle.

BRIEF DESCRIPTION OF THE DRAWINGS

Attached drawings indicate an embodiment for attainment of this invention.

DETAILED DESCRIPTION OF THE INVENTION

Figure 1:
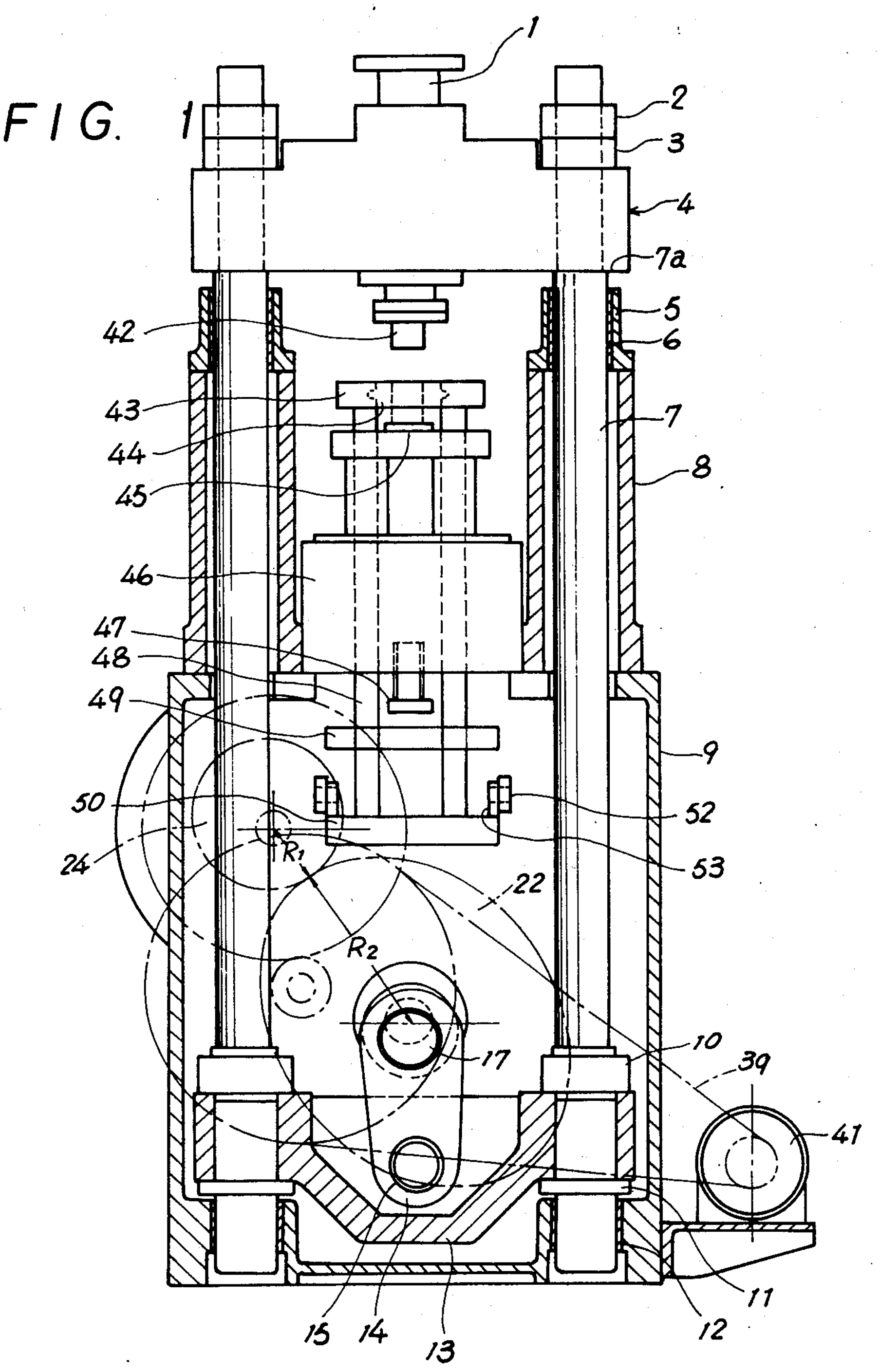
FIG. 1 is an elevation view which shows a powder compacting press.
Figure 2:
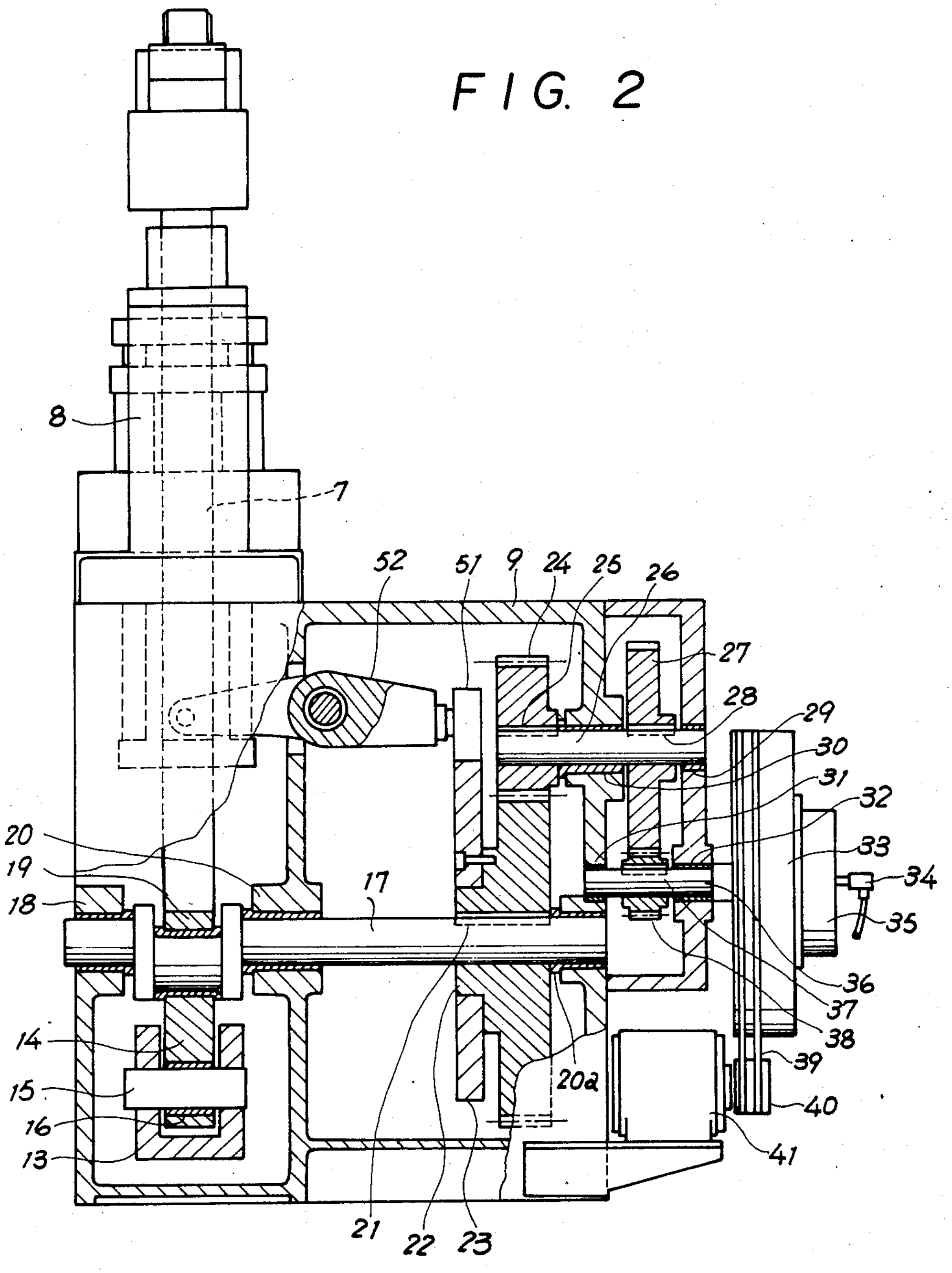
FIG. 2 is a side view of FIG. 1.

First, referring to FIG. 1 and FIG. 2, a powder compacting press applied to this invention will be described as follows. An upper ram 1 is secured on an upper horizontal beam member 4 so s to adjust its position in a vertical direction and an upper punch 42 which carries out the compacting forming is secured at the lower end of said upper ram 1. The upper horizontal beam member 4 is positoned by step portions 7*a* of a pair of tension rods 7 on right and left sides and integrally secured to the tension rod 7 with nuts 2 and 3. A flange 11 is formed at the lower portion of the tension rod 7 and, to said flange 11, a lower horizontal beam member 13 having an approximate U shape being secured by being screwed with nut 10. Accordingly, the upper horizontal beam member 4, lower horizontal beam member 13 and tension rod 7 on right and left sides are integrally incorporated and adapted to move up and down integrally. In this case, the upper ram 1 of the compression member incorporated therein moves vertically, thereby performing a press compacting. Such vertical movement is carried out with stability by inserting the tension rod 7 into a column 8 erectly installed to a frame 9 and further penetrating into a metal 6 in a metal housing 5 on said column 8. The vertical movement of said compression member is carried out by the rotation of crank shaft 17 secured rotatively to the frame 9 through metals 18, 20 and 20*a*. For this purpose, the crank shaft 17 is connected to the lower horizontal beam member 13 through a connecting rod 14 and a pin 15.

The rotation of said crank shaft 17 is carried out by the drive of a motor 41 and a power shaft 36 supported rotatively and releasably by frame 9 through metals 31 and 32 connected to said crank shaft 17. The connecting mechanism according to this example cnsists of an intermediate shaft 26 borne by the frame through metals 29 and 30, a single-stage reduction gear intervenes between said intermediate shaft 26 and the power shaft 36 and a transmission gear which intervenes between the intermediate shaft 26 and said crank shaft 17. The single-stage reduction gear consists of a single-stage reduction pinion gear 38 fixed to the power shaft 36 with key 37 and a single-stage reduction gear 27 fixed to the intermediate shaft 26 with key 28, to which circular gears are used. On the other hand, said transmission gear consists of a pinion gear 24 fixed to the intermediate shaft 26 with key 25 and a gear 22 fixed to the crank shaft 17 with key 21. The sum of radii, $R_1$ and $R_2$, in either of these gears is constant and these gears are formed by non-circular gears which increase or decrease the size of each radius $R_1$ and $R_2$ according to the angle of rotation. In this case, the diameter of gear 22 on the side of crank shaft 17 is larger than that of pinion gear 24 on side of intermediate shaft 26, whereby the reduction is possible. The gear cutting of a radius of pinion gear $R_1$ and of gear $R_2$ is carried out according to a curve shown by a real line A of FIG. 3. This forming is possible by using a special gear cutter. When formed to be a 1:2 reduction ratio, the upper ram 4 moves within a range of 0° to 180° per one rotation of the pinion gear 24, and one stroke is ended by two rotations of the pinion gear 24. Accordingly, the gear 22 in this case becomes a pitch circle of nearly an ellipse having a symmetrical form.

A fly wheel 33, pneumatic clutch 35 and a rotary coupling 34 are secured to the right end portion of said powder shaft 36, said fly wheel 33 being connected to said motor 41 by way of V belt 39 and V pulley 40 so that the power shaft 36 may be rotatively drived.

Then, a die set portion in this example which presses powders together with an upper punch 42 by the vertical movement of upper ram 1 consists of a die 44, die plate 43, tie rod 48, ejecting plate 50 and a fixed plate 46. The die set portion can be changed properly. In such die set portion, the die plate 43, tie rod 48 and ejecting plate 50 are integrally framed. The tie rod 48 penetrates into a fixed plate 46 to move vertically to a necessary length, while the filling depth of die 44 can be adjusted by positioning the upper limit of the die plate 43 with stopper 47. The numeral 49 is a method of die stability of die 44 and such means, for instance, is described in patent publication No. 57 (1974)-37440. Further, the lower punch 45 opposes to the upper punch 42 is secured to the fixed plate 46. Then, the vertical movement of the die plate 43 is carried out by way of an ejecting lever 52 pivotably secured at its left end portion to a ejecting block 53 of said ejecting plate 50, a rotary wheel 51 attached to the right end portion of the lever 52 and an ejecting cam 234 fixed to the gear 22 of the transmission gear composed of non-circular gear. A forming body is made by pressing compaction through pressing down the ejecting plate 50 at a fixed timing and ejected from the die 44.

Figure 3:
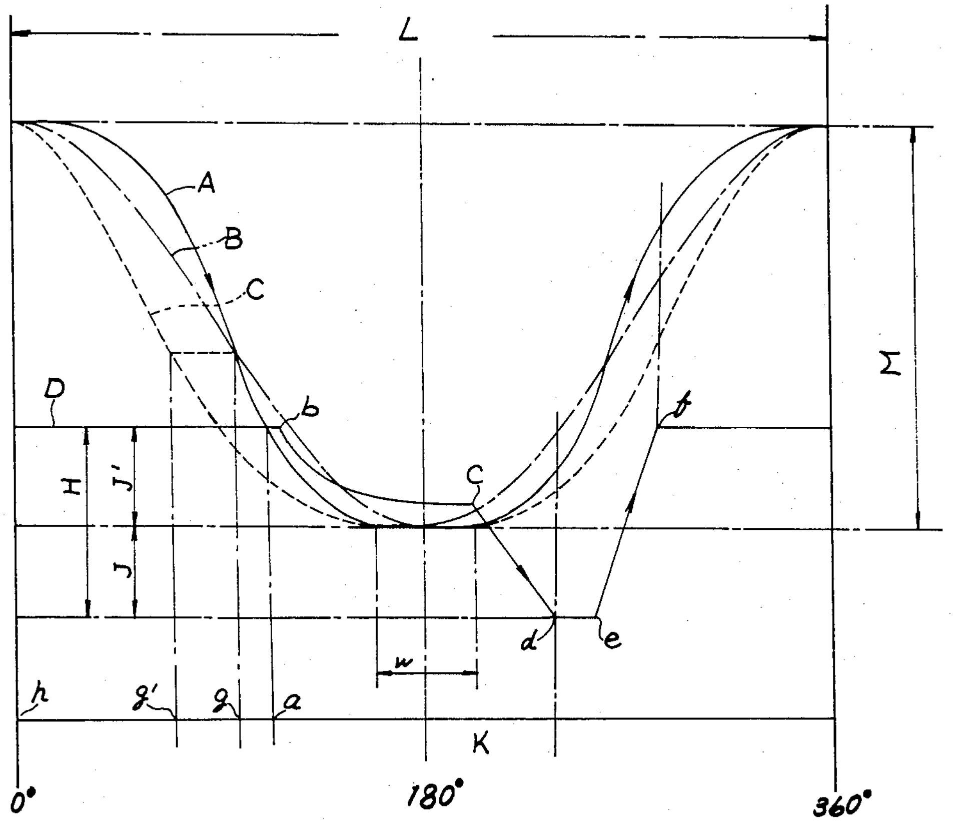
FIG. 3 is a timing diagram of an upper ram and a die.
Figure 4:
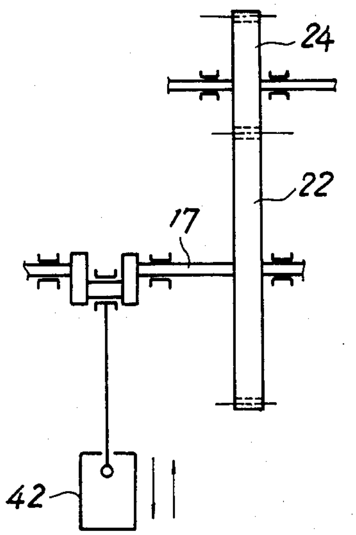
FIG. 4 and FIG. 5 are a side and a model elevation view of an example of the transmission gears respectively.
Figure 5:
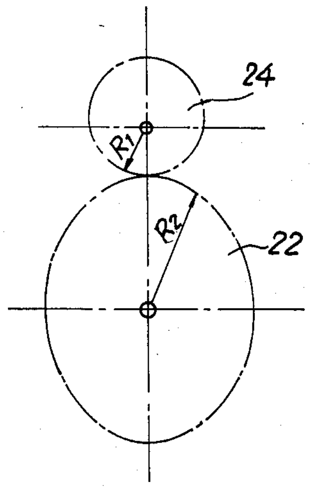

FIG. 4 and FIG. 5 indicate a transmission gear wherein a non-circular pinion gear 24 and a non-circular gear 22 are formed to be a reduction ratio of 1:2. The timing diagram of the upper ram according to the non-circular gear thus formed becomes like a real line A of FIG. 3. In FIG. 3, K is a rotative angle of the crank shaft, L is a one stroke, and M is a upper punch stroke. Further H shows a filling depth, J shows a height of the product and J' shows a pressing stroke. Furthermore, D shows a position of the upper surface of die 44, point a is a starting point of pressing of punch 42, point b is a starting point where the die 44 lowers together with punch 42, and point 180° is a completion point of pressing. In point c, the die 44 is pressed down by the action of the ejecting cam 23, and at point d extrusion of the product is ended. The die 44 is stopped at point d to point e, while it return to the filling position by rising up from point e to point f. In same FIG. 3, w is a stopped zone of the lower dead point of the upper ram. The compacting zone of this example is about W=30° and the compacting resembles toggle curve C and is sufficiently practiced.

On the other hand, the powder feeding time from point h to point g where the powders are fed nearly the same as sine curve B which shows that a sufficient powder feeding is carried out, while the powder feeding time of toggle curve C is from point h to point g', which shows that the press operation increases more than 30% compared with toggle curve C.

Figure 6:
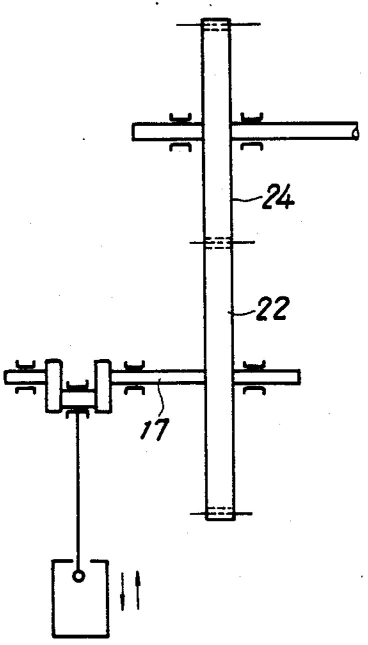
FIG. 6 and FIG. 7 are a side and a model elevation view of another example of the transmission gears.
Figure 7:
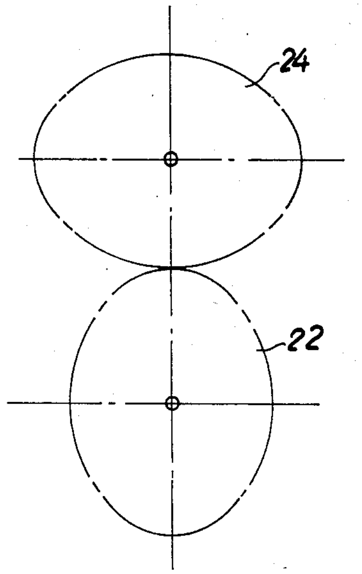

FIG. 6 and FIG. 7 indicate an example wherein non-circular gears 22 and 24 having a reduction ratio of 1:1 and are applied to a transmission gear. In this case, though the curve of region 0° to 180° is the same as above in, the region 180° to 360° it possible to return more rapidly since this zone is a no load zone for a press.

Figure 9:
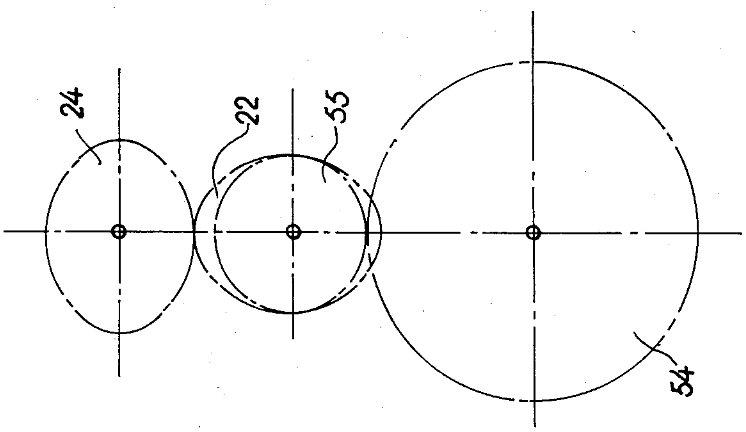
FIG. 8 and FIG. 9 are a side and a model elevation view of another example of the transmission gears.
Figure 8:
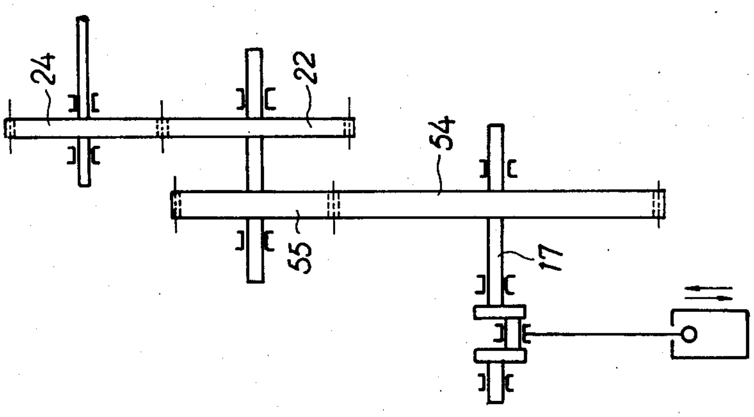

FIG. 8 and FIG. 9 indicate an example wherein in addition to non-circular gears 22 and 24 having a reduction ratio of 1:1, reduction gears 54 and 55 having a reduction ratio of 2:1 secured to the crank shaft 17. In this exmaple, since the transmission torque of a non-circular gear is small, the gear cutting is easy and the preparation cost is also cheap.

Further, as an external form of the non-circular gear used in this invention, an egg shape, heart shape and ellipse shape are also allowed. The reduction ratio is also not limited to 1:1 or 1:2, but can be changed properly according to the diameter of a gear.

Therefore, according to this invention the forming product is compacted effectively and the press working is also carried out promptly since the powder feeding time takes longer using a non-circular gear as a transmission gear and compaction time is also prolonged. Further, the preparation is easy, and the maintenance and operation are also simplified due to a simple mechanism.

What is claimed is:

1. A driving apparatus for a powder compacting press, said driving apparatus comprising:

- a power shaft adapted to be driven by rotation of a motor,
- a crank shaft interconnected to said power shaft for transmitting a vertical movement to a ram of the press by driving of the motor to thereby compact raw powders in a die of the press by an upper punch of the press fixed to the ram during downward movement of the ram,
- a pair of engaged non-circular gears connects said power shaft to said crank shaft, said gears having a constant sum of radii at a contact point of said gears and said gears vary a ratio of reduction velocity by variation of each radius of said gears according to the rotation thereof, said gears engaging each other so that a maximum ratio of reduction velocity is obtained at a lowermost dead point of travel of the ram.

2. The driving apparatus according to claim 1, wherein said gears have a reduction ratio of 1:2.

3. A driving apparatus according to claim 1 wherein the said gears have a reduction ratio of 1:1.

* * * * *